United States Patent

Martin et al.

[11] Patent Number: 6,148,608
[45] Date of Patent: Nov. 21, 2000

[54] DIVERGENT PETAL ARRANGEMENT FOR A CONVERGENT-DIVERGENT AIRCRAFT ENGINE NOZZLE

[75] Inventors: Luis Martin, Bilbao; Dionisio Silvestre, Cabanillas del Campo; Daniel Ikaza, Berango, all of Spain

[73] Assignee: Industria de Turbo Propulsores S.A., Zamudio, Spain

[21] Appl. No.: 09/007,384

[22] Filed: Jan. 15, 1998

[30] Foreign Application Priority Data

Jan. 17, 1997 [EP] European Pat. Off. ............. 97500007

[51] Int. Cl.[7] .............................. B64D 33/04; F02K 1/80; F02K 1/12
[52] U.S. Cl. ................. 60/232; 239/265.33; 239/265.39; 239/265.41
[58] Field of Search ............... 60/232, 230; 239/265.19, 239/265.33, 265.37, 265.39, 265.41, 265.43

[56] References Cited

U.S. PATENT DOCUMENTS

| | | |
|---|---|---|
| 3,288,374 | 11/1966 | Colville ............................ 239/265.39 |
| 4,049,199 | 9/1977 | Nightingale ..................... 239/265.39 |
| 4,128,208 | 12/1978 | Ryan et al. ...................... 239/265.39 |
| 4,544,098 | 10/1985 | Warburton ....................... 239/265.41 |
| 4,994,660 | 2/1991 | Hauer ............................... 239/265.41 |
| 5,039,014 | 8/1991 | Lippmeier ....................... 239/265.39 |
| 5,232,158 | 8/1993 | Barcza .................................. 60/232 |
| 5,269,467 | 12/1993 | Williams .......................... 239/265.41 |
| 5,484,105 | 1/1996 | Ausdenmoore ................... 239/127.3 |
| 5,513,799 | 5/1996 | Mendia et al. ................... 239/265.41 |

FOREIGN PATENT DOCUMENTS

| | | |
|---|---|---|
| 0 644 325 | 3/1995 | European Pat. Off. . |
| 2 030 532 | 11/1970 | France . |
| 2 230 299 | 10/1990 | United Kingdom . |

*Primary Examiner*—Ted Kim
*Attorney, Agent, or Firm*—Darby & Darby

[57] ABSTRACT

Divergent petal arrangement for convergent-divergent nozzles for application in aircraft engines, where the divergent section comprises master divergent petals (3) and slave divergent petals (4), having the latter a bent cross section with the concave side facing the gas, and with the possibility of having a number of hangers (7) mounted on the slave divergent petals (4) and presenting hooks (12) at the ends of said hangers (7), said hooks interacting with hanger stops (5) provided on the master divergent petals (3), hence limiting the side movement of the slave divergent petals (4).

5 Claims, 2 Drawing Sheets

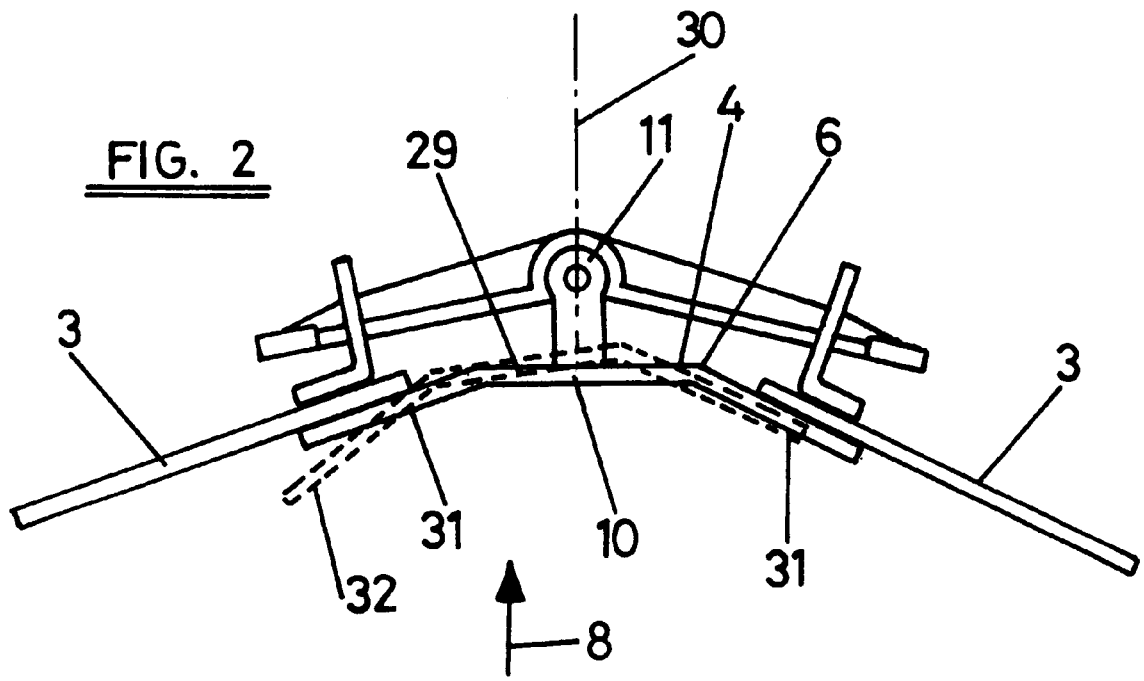
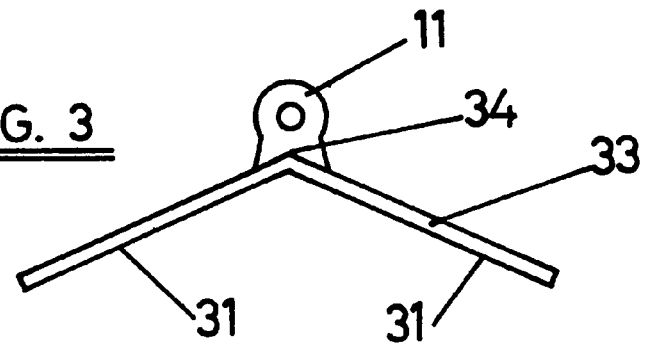
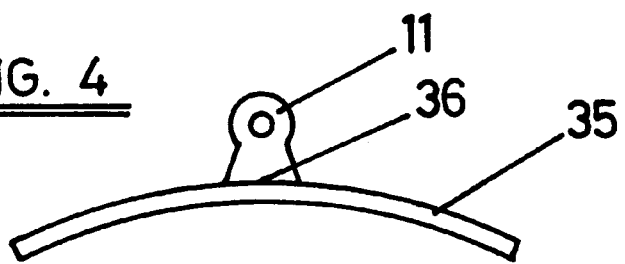

DIVERGENT PETAL ARRANGEMENT FOR A CONVERGENT-DIVERGENT AIRCRAFT ENGINE NOZZLE

The scope of the present invention is a divergent petal arrangement for convergent-divergent nozzles for application in aircraft engines.

Many current military aircraft jet engines are provided with a convergent-divergent exhaust nozzle. By acting upon the convergent and/or the divergent sections of the nozzle, the throat area and/or the exit area of the nozzle can be controlled during flight, and by that means the optimum running condition of the jet engine can be achieved for every flight case.

The divergent section of the nozzle is then an effective frustum-like shaped duct, which needs to open and close both ends, namely throat area and exit area, as required by the engine control and actuation system.

One of the possible mechanical configurations for the divergent duct section consists of a number of master divergent petals, evenly distributed circumferentially, which are mechanically linked to the main nozzle structure and actuation system, and which dictate the position of the divergent section of the nozzle, plus a number of slave divergent petals which seal the gap between every two neighbouring master divergent petals, and which must follow the motion of the master divergent petals at all times, to allow sealing. In normal engine operating condition, the gas pressure inside the nozzle pushes the slave divergent petals against the master divergent petals, hence achieving the sealing.

The slave divergent petals must behave in such a manner that they avoid any possibility of disengagement from the master divergent petals. By disengagement it is understood the situation in which a slave divergent petal and a neighbouring master divergent petal present an overlapping area which does not cover the full length of the divergent section, that is, the gas flow "sees" an opening in radial direction, that is, a possible exit path in radial direction, upstream of the exit area at the rear end of the divergent section. This disengagement can have dangerous consequences, namely unwanted hot gas leakages to the outside of the duct, and wrong overlapping of the petals when they come back to the engaged position.

The position and orientation of every master divergent petal is governed by its link to the convergent section by means of a joint with the corresponding master convergent petal, and by its link to the external ring or structure by means of a compression strut.

The position and orientation of every slave divergent petal has to be governed by means of some sort of link to the master divergent petals and/or to the convergent section. One of the possible mechanical configurations comprises, among other components, a centralizing mechanism that governs the position and orientation of every slave divergent petal with respect to its two neighbouring master divergent petals. This mechanism can be presented in several forms, but they all have many small parts, and that means mechanical complexity and weight. Some of these mechanisms include a joint to the slave convergent petal, but this is not desirable since it relates the position of the slave divergent petal with respect to the slave convergent petal, which in itself is not properly positioned. This may induce bigger misalignments in the slave divergent petals, and hence bigger risk of disengagement.

Another feature that the slave divergent petals must present are the hangers. The hangers are mounted on some hanger supports on the outside face of the slave divergent petal and overlap with the outside face of the base of the two neighbouring master divergent petals. By these means, the slave divergent petals are stopped from falling towards the centre of the nozzle in cases where the gas pressure does not push the slave divergent petals against the master divergent petals, i.e. negative load condition, or engine-off condition.

A further feature that the slave divergent petals must present is a certain stiffness and resistance to longitudinal bending. In some engine operating conditions, such as negative load cases, the slave divergent petal must hang from its hangers; and in some other engine operating conditions, there is positive pressure load on one sector of the slave divergent petal and negative pressure load on the rest of the slave divergent petal, and therefore the petal is subject to heavy bending loads.

The scope of the present invention is to provide a divergent petal arrangement to eliminate or minimize the need for a centralizing mechanism, said arrangement being such that the gas pressure acting upon the surface of the slave divergent petal tends to keep the slave divergent petal in its centered position, hence eliminating the need for a centralizing mechanism. As an additional benefit, the new arrangement avoids the use of a mechanical joint between the slave convergent petals and the slave divergent petals. Additionally, it provides enough longitudinal bending stiffness so as to eliminate the need for a stiffening fin.

The present invention consists of a divergent petal arrangement devised to eliminate or minimize the need for a centralizing mechanism.

In the present invention, the slave divergent petal is self-centering, that is, by virtue of the cross section of the base of the slave divergent petal, the load exerted by the gas upon the slave divergent petal tends to keep the slave divergent petal in its centered position.

The invention achieves its objectives by means of a divergent petal arrangement for convergent-divergent nozzles for application in aircraft engines, of the kind that comprises a number of master divergent petals linked to the convergent section and to the compression struts and a number of slave divergent petals, each of which is mounted with limited allowed movement between two master divergent petals by means of hangers and in said arrangement each slave divergent petal is provided with a bent cross section, with the concave side facing the gas, said section including two wings, relatively flat, inclined a certain angle, to approximately match the bases of the neighbouring master divergent petals, said slave divergent petals presenting a transition zone in the forward end that blends the cross section at the throat into said bent cross section.

Said arrangement includes also a number of stops on the master divergent petals that interact with hooks provided at the ends of the hangers mounted on the slave divergent petals to limit the relative side movement of the slave divergent petals with respect to the neighbouring master divergent petals.

The cross section of the slave divergent petals may present several different configurations, for example chevron-shaped in case it consists of two wings only and of no central part, or arc-like, in which no distinct wings can be distinguished from the rest.

The considered cross sections present sufficient longitudinal bending so as to eliminate the need for a stiffening fin. This implies a saving in mass and in manufacturing cost.

Taking in consideration the shape of the slave divergent petal, it will be automatically self-centered during normal engine operation, but nevertheless it presents a fail-safe mechanism comprising the stops provided on the master divergent petals and the hooks provided on the hangers mounted on the slave divergent petals, to prevent disengagement, in the cases in which self-centering is not effective, for example, low- or negative-load cases, engine-off condition, unexpected behaviour of friction, etc. By this means the overlapping is guaranteed, and hence the sealing.

The main advantage of the invention consists of the possibility of utilizing the master petal—slave petal concept in the divergent section of a convergent-divergent nozzle, without using a centralizing mechanism for the slave divergent petals, hence reducing mechanical complexity and weight.

Another advantage is to eliminate the need for a stiffening fin on the slave divergent petal, hence reducing weight and manufacturing cost.

A further advantage is to avoid the mechanical joint between the slave convergent petal and the slave divergent petal, which is prone to failures.

These objects and other features and advantages will become more readily apparent in the following description when taken in conjunction with the appended drawings, in which it has been represented as an example, not limiting, the divergent petal arrangement of an exhaust nozzle, devised according to the principles of the invention.

In the appended drawings:

FIG. 2 is a cross-sectional view of the arrangement represented in FIG. 1, cut by line II—II.

FIGS. 3 and 4 show cross sections of other possible shapes of the slave divergent petal.

Figure 1:
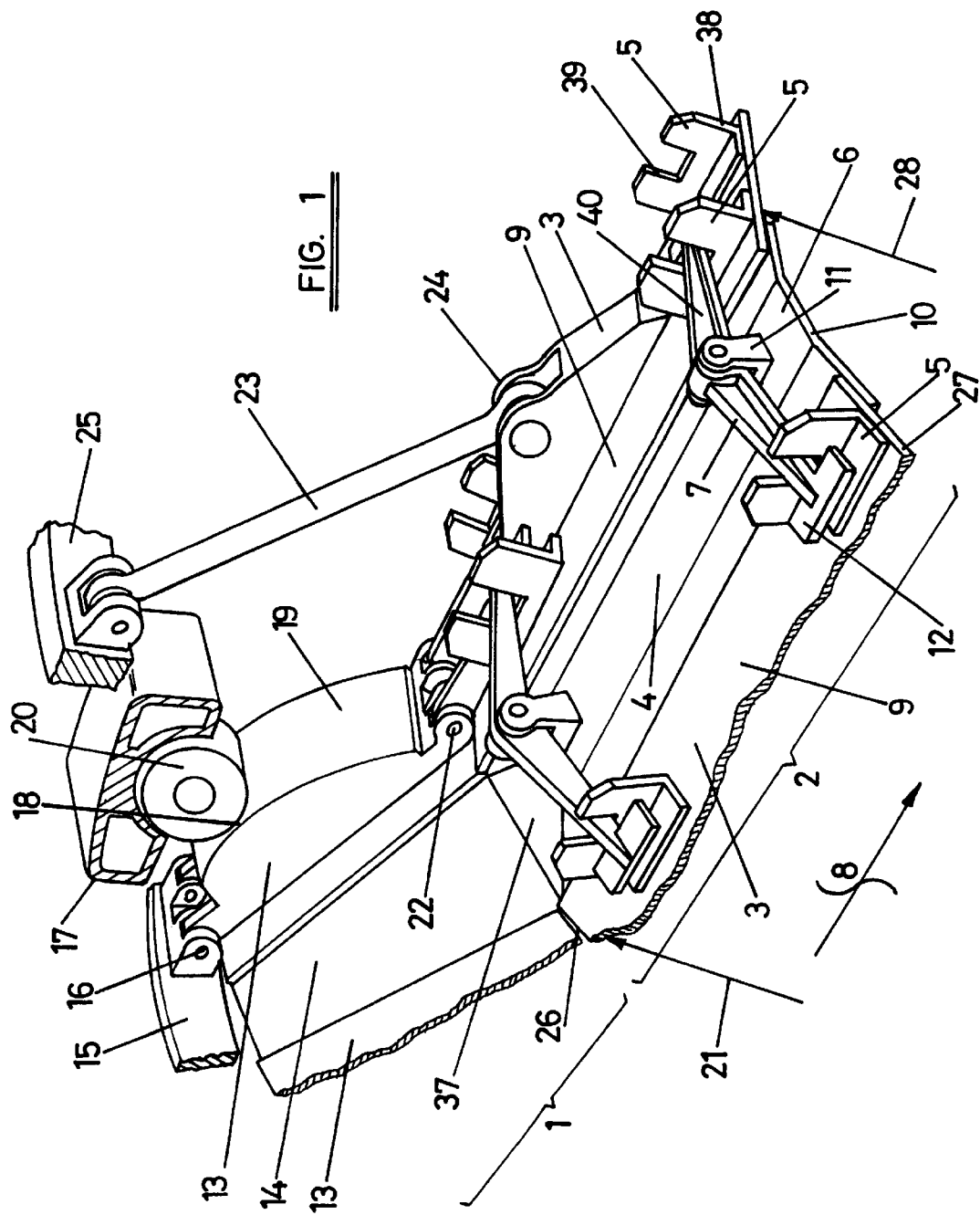
FIG. 1 represents a partial cut-away perspective view of a convergent-divergent nozzle, showing the convergent and divergent sections, and the divergent petal arrangement, some items having been omitted for clarity.

With reference to FIG. 1, it can be observed that the convergent-divergent nozzle presents a convergent section 1 and a divergent section 2. The scope of the invention covers only the petal arrangement in the divergent section 2, but the convergent section 1 and the mechanical arrangement of the nozzle are also explained to some detail in order to facilitate the understanding of the nozzle assembly.

As can be observed in said FIG. 1, the convergent section 1 comprises mainly a number of master convergent petals 13 and a number of slave convergent petals 14. Each master convergent petal 13 is mechanically linked to the main nozzle structure 15 by means of a pin joint 16 and is linked to the actuation unison ring 17 by means of a roller-cam joint 18, in which the cam track 19 is part of the master convergent petal 13 and the roller 20 is linked to the actuation unison ring 17. By acting on the axial position of the actuation unison ring 17, the rollers 20 roll on the cam tracks 19 mounted on the master convergent petals 13, and the master convergent petals 13 pivot about the pin joint 16 with respect to the main nozzle structure 15, hence controlling the throat area 21. Each slave convergent petal 14 seals the gap between its two neighbouring master convergent petals 13, in order to complete the convergent section 1 of the nozzle. In normal engine operating condition, the gas pressure 8 pushes the slave convergent petals 14 against the master convergent petals 13, hence achieving the sealing in the convergent section 1.

In the preferred embodiment, the divergent section 2 comprises mainly a number of master divergent petals 3 and a number of slave divergent petals 4. Each master divergent petal 3 is mechanically linked to a master convergent petal 13 by means of a pin joint 22, and to a compression strut 23 by means of a pin joint 24. The compression struts 23 are linked to the main nozzle structure 25 or alternatively to a second actuation unison ring. By controlling the convergent section 1 as explained above, the position of the front end 26 of the master divergent petals 3 is governed. The combined mechanism formed by master convergent petal 13, master divergent petal 3 and compression strut 23, governs the position of the rear end 27 of the master divergent petals 3, hence governing the exit area 28 of the nozzle. Each slave divergent petal 4 seals the gap between its two neighbouring master divergent petals 3, in order to complete the divergent section 2 of the nozzle. In normal engine operating condition, the gas pressure 8 pushes the slave divergent petals 4 against the master divergent petals 3, hence achieving the sealing in the divergent section 2.

Each slave divergent petal 4 comprises mainly a petal base 6 and a number of hangers 7, which are mounted on a number of hanger supports 11.

With reference to FIG. 2, it can be observed that the base 6 of each slave divergent petal 4 presents an vent open cross section 10, said cross section 10 being concave from the gas side and at least including two relatively flat wings 31 inclined a certain angle to approximately match the base 9 of the neighbouring master divergent petals 3 and including generally also a relatively flat central part 29, which is relatively perpendicular to the plane of symmetry 30 of the slave divergent petal 4, said central part 29 not being absolutely necessary to produce the desired effect. The pressure of the gas flow 8 keeps the wings 31 of the base 6 of the slave divergent petal 4 firmly in contact with the base 9 of the master divergent petals 3, hence achieving sealing in the divergent section 2. By virtue of this concave shape cross section 10, the gas pressure 8 tends to keep the slave divergent petal 4 in its centered position at all times, and when some misalignment 32 should occur, the pressure 8 will tend to return the slave divergent petal 4 to its centered position.

The preferred embodiment presents a trapezoid-like cross section 10 as described above, but this is not the only section that produces this effect. The same effect can also be achieved with a chevron-like cross section 33, which is identical to the trapezoid-like cross section 10, except for the fact that it has only two wings 31 and no central part 29. The hanger supports 11 must then be mounted on to the bend 34 or corner between the two wings 31.

Another possible cross section is a curved shape. An arc-like cross section 35 might produce the same effect, although in a less optimum fashion. The hanger supports 11 must be mounted on to the central area 36 of the arc-like cross section 35.

In the preferred embodiment (FIG. 1), each slave divergent petal 4 presents a transition zone 37 that blends the cross-section at the throat area 21 similar to that of the slave convergent petal 14 into the shaped cross section 10 described above, to allow sealing at the throat area 21.

In the preferred embodiment, each slave divergent petal 4 is linked to the master divergent petals 3 by means of a number of hangers 7, which are mounted on the hanger supports 11, which in turn are mounted on to the base 6 of the slave divergent petal 4. These hangers 7 are provided with hooks 12 at their ends, and these hooks 12 cannot cross the hanger stops 5 mounted on the neighbouring master divergent petals 3.

In the preferred embodiment, each master divergent petal 3 presents a number of hanger stops 5 at either side, which prevent the hooks 12 of the hangers 7 of the slave divergent petal 4 at either side from disengaging from the master divergent petal 3. This, in turn, prevents the disengagement of the base 6 of the slave divergent petal 4 from the master divergent petal 3.

In the preferred embodiment, each hanger stop 5 has the shape of a small bracket 38, which is mounted on to the base 9 of the master divergent petal 3, and which presents a slot 39 or window or cut-out. The body 40 of the hanger 7 can slide through the slot 39, but cannot disengage from it because the hook 12 cannot cross the slot 39. The invention is not limited to this arrangement.

This interaction between the hanger hooks 12 and the hanger stops 5 eliminates the possibility of a disengagement between slave divergent petals 4 and master divergent petals 3, but does not stop the slave divergent petal 4 from leaving its centered position between its two neighbouring master divergent petals 3. This centering role is performed by the shape of the slave divergent petal base 6, as described above.

What is claimed is:

1. A divergent petal arrangement for convergent-divergent nozzles for application in aircraft engines wherein a gas passes through the interior of said convergent-divergent nozzles, said divergent petal arrangement comprising:

a plurality of master divergent petals being linked to a convergent section and each of said master divergent petals including a base and being further linked to a compression strut and a plurality of slave divergent petals;

each of said slave divergent petals including a plurality of hangers and being movably mounted between two of said master divergent petals by each of said hangers movably interacting with one of said two master divergent petals; and each of said slave divergent petals including a bent open cross-section with a concave side facing said gas and two relatively flat wings and each of said relatively flat wings being inclined at an angle to approximately match the angle of said base of said neighboring master divergent petal to which said relatively flat wing is connected, gas pressure acting on the bent open cross section of the slave petals to provide the means for centering the slave divergent petals with respect to the master divergent petals with an absence of a separate mechanical centralizing mechanism for governing the orientation of each of said slave divergent petals with respect to said neighboring master slave divergent petals.

2. The divergent petal arrangement in accordance with claim 1 further comprising:

each of said hangers having a first end mounted to said slave divergent petal and a second end opposite said first end, said second end including a hook which movably interacts with said neighboring master divergent petal; and each of said master divergent petals including a plurality of hanger stops which come into movable contact with said hooks, whereby the relative side movement of said slave divergent petals is limited with respect to said neighboring master divergent petals.

3. The divergent petal arrangement in accordance with claim 1 wherein said slave divergent petal further includes a throat having a cross section and a transition zone and said transition zone blends from said cross section at said throat into said bent cross section.

4. The divergent petal arrangement in accordance with claim 1 wherein said bent open cross section of said slave divergent petal includes a configuration of one of trapezoid-shaped and chevron-shaped with said two relatively flat wings which contact each other.

5. A divergent petal arrangement for convergent-divergent nozzles for application in aircraft engines wherein a gas passes through the interior of said convergent-divergent nozzles, said divergent petal arrangement comprising:

a plurality of master divergent petals being linked to a convergent section and each of said master divergent petals including a base and being further linked to a compression strut and a plurality of slave divergent petals;

each of said slave divergent petals including a plurality of hangers and being movably mounted between two of said master divergent petals by each of said hangers movably interacting with one of said two master divergent petals; and each of said slave divergent petals including a bent open arc-like configuration cross-section with a concave side facing said gas, whereby said slave divergent petals primarily contact said neighboring master divergent petals along said arc-like cross-section of said slave divergent petals, gas pressure acting on the bent open arc-like configuration cross section of the slave petals to provide the means for centering the slave divergent petals with respect to the master divergent petals with an absence of a separate mechanical centralizing mechanism for governing the orientation of each of said slave divergent petals with respect to said neighboring master slave divergent petals.

* * * * *